(12) United States Patent
Baehr-Jones et al.

(10) Patent No.: US 10,788,679 B2
(45) Date of Patent: Sep. 29, 2020

(54) METHOD AND CIRCUIT FOR ENDLESS PHASE AND POLARIZATION CONTROL

(71) Applicant: Elenion Technologies, LLC, New York, NY (US)

(72) Inventors: Thomas Wetteland Baehr-Jones, Arcadia, CA (US); Rafid Antoon Sukkar, Niles, IL (US); Richard C. Younce, Naperville, IL (US)

(73) Assignee: Elenion Technologies, LLC, New York, NY (US)

( * ) Notice: Subject to any disclaimer, the term of this patent is extended or adjusted under 35 U.S.C. 154(b) by 296 days.

(21) Appl. No.: 15/840,223

(22) Filed: Dec. 13, 2017

(65) Prior Publication Data
US 2019/0179163 A1  Jun. 13, 2019

(51) Int. Cl.
G02B 27/28 (2006.01)
G02B 6/27 (2006.01)
G02B 6/293 (2006.01)
G02B 6/126 (2006.01)
G02B 6/10 (2006.01)
G02B 6/35 (2006.01)

(52) U.S. Cl.
CPC ........... *G02B 27/286* (2013.01); *G02B 6/105* (2013.01); *G02B 6/126* (2013.01); *G02B 6/272* (2013.01); *G02B 6/274* (2013.01); *G02B 6/2766* (2013.01); *G02B 6/2773* (2013.01); *G02B 6/2938* (2013.01); *G02B 6/3562* (2013.01); *G02B 27/283* (2013.01); *G02B 6/3596* (2013.01)

(58) Field of Classification Search
CPC ..... G02B 27/286; G02B 6/272; G02B 6/2015
See application file for complete search history.

(56) References Cited

U.S. PATENT DOCUMENTS

| | | | |
|---|---|---|---|
| 4,966,431 A | 10/1990 | Heismann | |
| 6,538,787 B1 * | 3/2003 | Moeller | G02B 6/272 |
| | | | 359/249 |
| 8,787,708 B2 | 7/2014 | Doerr | |
| 2003/0206676 A1 | 11/2003 | Ovadia | |
| 2009/0103921 A1 | 4/2009 | Frankel | |

OTHER PUBLICATIONS

Walker, N.G. et al., "Polarization control for coherent communications," Journal of Lightwave Technology, vol. 8, No. 3, Mar. 1990, pp. 438-458 (21 pages).

(Continued)

*Primary Examiner* — Sung H Pak
*Assistant Examiner* — Hoang Q Tran
(74) *Attorney, Agent, or Firm* — Stratford Managers Corporation

(57) ABSTRACT

A path-switchable dual polarization controller includes an input polarization beam splitter (PBS) switchably connected to either one of two optical controllers configured to tunably remix polarization components received from the PBS to obtain two target polarization components of input light. When one of the optical controllers requires a reset, PBS outputs are switched to the other optical controller, and the first optical controller is reset offline. The circuit may be used for polarization demultiplexing.

13 Claims, 9 Drawing Sheets

(56) References Cited

OTHER PUBLICATIONS

Heismann, F., "Analysis of a reset-free polarization controller for fast automatic polarization stabilization in fiber-optic transmission systems," Journal of Lightwave Technology, vol. 12, No. 4, Apr. 1994, pp. 690-699 (10 pages).
Martinelli, M. et al., "Endless polarization control algorithm using adjustable linear retarders with fixed axes," Journal of Lightwave Technology, vol. 21, No. 9, Sep. 2003, pp. 2089-2096 (8 pages).
Doerr, C.R. et al., "Monolithic PDM-DQPSK receiver in silicon," paper PD3.6, ECOC 2010 (3 pages).

\* cited by examiner

METHOD AND CIRCUIT FOR ENDLESS PHASE AND POLARIZATION CONTROL

FIELD OF THE INVENTION

The invention generally relates to photonic circuits, and more particularly relates to methods and devices for seamlessly controlling optical phase and/or polarization of light without resets.

BACKGROUND OF THE INVENTION

The ability to seamlessly vary an optical phase of light signal is useful in many applications, including but not limited to optical communications where modulated light is used to carry information. One example of a device in which the optical phase of light is purposefully varied to achieve a desired result is a polarization controller. Optical communication signals propagating in fiber based optical links experience random changes in polarization state. At the receiver site these signals are typically coupled into planar light wave circuits which performance is sensitive to the polarization state of input light. Accordingly, a polarization controller may be needed that is capable of a seamless transformation of the received light from a randomly fluctuating state of polarization (SOP) into a specific SOP that is desired for the receiver circuitry. Polarization controllers are particularly useful in optical systems employing polarization multiplexing (PM), in which two modulated optical signals that are polarization multiplexed at the transmitter site have to be polarization de-multiplexed at the receiver site. In order to correctly extract the two transmitter-generated PM light signal at the receiver from a received optical signal with a randomly fluctuating SOP, the receiver requires a tracking polarization controller at its input. However, conventional polarization transformers typically require a reset cycle when their operating range is exceeded. Unfortunately, reset cycles give rise to periods of unacceptable data loss. Endless polarization transformers provide continuous control of the polarization state over an infinite range of polarization compensation.

A polarization controller may be implemented in a photonic integrated circuit by splitting input light into two linearly polarized light beams with a polarization beam splitter, rotating the polarization of one of them, and then using a cascade of optical couplers and optical phase tuners to re-mix the two lights with proper phase shifts therebetween to obtain light corresponding to a desired SOP. A typical optical phase tuner however has a limited operating range and requires a reset when is led to its limit by a control circuit. When such an optical phase tuner is used in an optical system that requires endless control of the optical phase and/or the state of polarization of light, intermittent drops in the system performance may occur while the phase of the tuner is being reset. While endless polarization controllers have been disclosed, they typically require four or more active controls that may slow down the controller update.

Accordingly, it may be understood that there may be significant problems and shortcomings associated with current solutions and technologies for controlling the optical phase and/or the state of polarization of an optical signal.

SUMMARY OF THE INVENTION

An aspect of the disclosure provides an optical circuit for adaptive polarization splitting of input light, comprising: a polarization beam splitter (PBS) configured to split input light into first two polarization components thereof, two output circuit ports for outputting second two polarization components of the input light, and two optical controllers, each of which configured to tunably convert the first two polarization components of the input light into second two polarization components of the input light. Each of the two optical controllers includes two input controller ports, two output controller ports, and at least one optical phase tuner (OPT) that is configured to vary an optical phase of light propagating therethrough within an operating range thereof. A switching arrangement is further provided that is operable to switchably direct the input light to the two output circuit ports through either one of the two optical controllers.

Each optical controller may comprise an input 2×2 waveguide coupler having two input coupler ports for receiving the two first polarization components of the input light and an output 2×2 waveguide coupler having two output coupler ports for connecting to the two output circuit ports.

In one implementation the switching arrangement may comprise two input 1×2 optical switches configured to switchably connect output ports of the PBS to the two input controller ports of either one of the two optical controllers, and two output 2×1 optical switches configured to switchably connect the two output circuit ports to the two output controller ports of either one of the first or second optical controllers.

In one implementation the switching arrangement may comprise two input 1×2 optical splitters connecting each output of the PBS to one of the input controller ports of each of the two optical controllers. The switching arrangement may further comprise two output 2×1 switches configured to switchably connect the two output circuit ports to the two output controller ports of either one of the first or second optical controllers.

The switching arrangement may also comprise four optical valves disposed in optical paths connecting the two output circuit ports to two output controller ports of each of the two optical controllers, wherein each optical valve is switchable between an open state wherein it is substantially transparent to light propagating in the corresponding optical path and a closed state wherein the optical valve breaks the corresponding optical path.

The optical circuit may further include two or more monitoring photodiodes (PD) coupled to output controller ports of the two optical controllers, and an operation controller operatively connected to the four optical valves, the monitoring PDs, and the OPTs in each of the two optical controllers. The operation controller may be configured to operate the four optical valves so as to connect only one of the two optical controllers to the two output circuit ports at a time, and tune the at least one of the OPTs of one of the two optical controllers that is being currently connected to the first and second output circuit ports of the optical circuit in dependence upon one or more feedback signals received from the monitoring PDs.

In accordance with an aspect of the present disclosure, the optical circuit may be configured for de-multiplexing polarization multiplexed (PM) optical signals, and may further comprise two or more electro-optical (EO) converters separately coupled to the two output circuit ports, wherein each of the two EO converters comprises at least one of an optical hybrid and a photodetector.

In accordance with an aspect of the present disclosure, the optical circuit may be configured for de-multiplexing polarization multiplexed (PM) quadrature-modulated (QM) optical signals, and may further comprise eight photodetectors (PD) and four optical hybrids (OH), each OH including four output OH ports and an input HP port. The four OHs may include first two OHs with the input ports optically connected to the two output controller ports of one of the two optical controllers, and second two OHs with the input ports optically connected to the two output controller ports of the other one of the two optical controllers. The switching arrangement may be operable to switch between establishing one-to-one optical connections between the eight PDs and the output OH ports of either the first two OHs or the second two OHs.

An aspect of the present disclosure provides a method for seamless polarization control of input light, comprising: splitting the input light into first two polarization components thereof; and, converting the first two polarization components of the input light into second two polarization components thereof responsive to a varying polarization control signal, wherein the converting comprises using two polarization converters (PC), each comprising an optical phase tuner (OPT) and operable to convert the first two polarization components into the second two polarization components by tuning the corresponding OPT in an operating range thereof. The converting may comprise: a) obtaining the second two polarization components from a first one of the two PC while tuning the OPT thereof responsive to the polarization control signal, and b) when the OPT of the one of the two PC reaches a limit of an operating range thereof, switching to obtaining the second two polarization components from the second one of the two PC while tuning the OPT thereof responsive to the polarization control signal.

An aspect of the present disclosure provides an optical circuit comprising: a cascade of waveguide directional couplers connected in series so as to form a first Mach-Zehnder interferometer (MZI) including an input port and a first optical phase tuner (OPT), and a second MZI optically connected to the first MZI in series therewith, the second MZI including two output ports; and, a bypass waveguide connecting the input port of the first MZI to one of two output ports of the second MZI so as to direct a portion of input light received into the input port of the first MZI to propagate backwards through the cascade toward the first MZI.

An aspect of the present disclosure provides an optical circuit comprising: a cascade of waveguide directional couplers (WGDC) connected in series, the cascade including a first WGDC having an input port for receiving input light, a last WGDC having two output ports, and two or more optical phase tuners (OPT) optically connected between the first and the last WGDC; and, a bypass waveguide connecting the input port of the first WGDC to one of the two output ports of the second WGDC so as to direct a portion of input light received into the input port of the first WGDC to propagate backwards through the cascade toward the first WGDC.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
CMOS Complementary Metal-Oxide-Semiconductor
GaAs Gallium Arsenide
InP Indium Phosphide
LiNbO$_3$ Lithium Niobate
PIC Photonic Integrated Circuits
SOI Silicon on Insulator
PSK Phase Shift Keying
BPSK Binary Phase Shift Keying
ASK Amplitude Shift Keying
QAM Quadrature Amplitude Modulation
QPSK Quaternary Phase Shift Keying Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent. Notation $V\pi$ refers to a bias voltage of a Mach-Zehnder modulator (MZM) that corresponds to a change in a relative phase delay between arms of the MZM by $\pi$ rad, or 180 degrees, which corresponds to a change from a minimum to a next maximum in the MZM transmission.

One aspect of the present disclosure relates to an optical circuit and related method that enables to seamlessly vary an optical phase of light without apparent resets. Variants of the approach may be used to provide endless polarization control in various optical systems and modules including optical receivers for polarization multiplexed optical signals.

Figure 1:
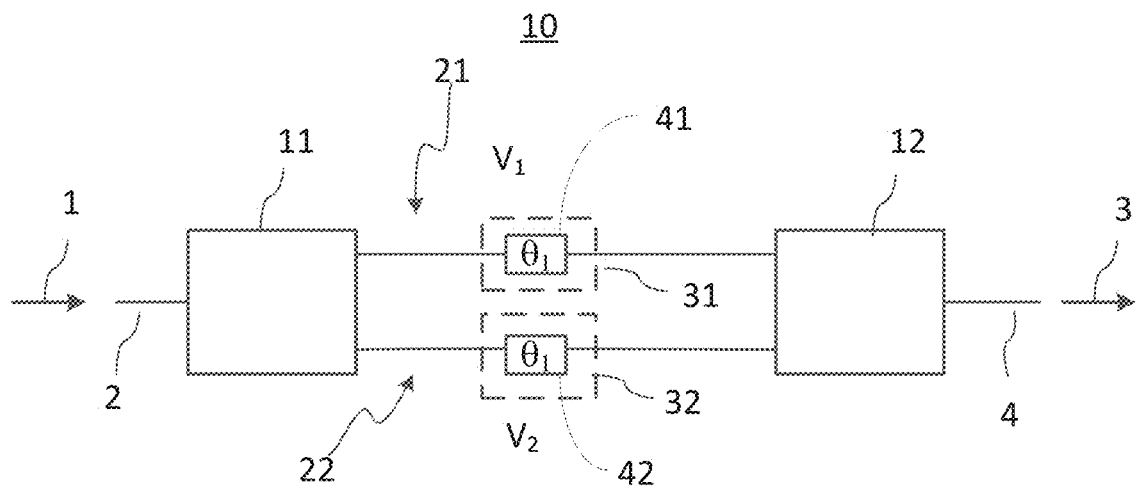
FIG. 1 is a schematic block diagram of a switchable-path optical circuit for endless optical phase tuning.

With reference to FIG. 1, there is generally illustrated a switchable-path optical circuit (SPOC) 10 wherein an endless control of optical phase may be implemented. SPOC 10 includes two optical paths 21 and 22 along which light 1 received in an input port 2 may be directed to an output port 4 by means of a switching arrangement that includes an input switching or broadcasting optical element 11 and an output optical selector 12. The output port 4 may also be referred to herein as the first output port. The first optical path 21 includes a first optical controller 31 while the second optical path 22 includes a second optical controller 32. The first optical controller 31 may be in the form, or include, a first optical phase tuner (OPT) 41, which is configured to vary the optical phase of light propagating through it in response to varying a first OPT control signal $V_1$ applied to the first OPT. The second optical controller 32 may be in the form, or include, a second OPT 42, which is configured to vary the optical phase of light propagating through OPT 42 in response to varying a second OPT control signal $V_2$ applied to the second OPT. The first and second OPT control signals $V_1$, $V_2$ may be for example in the form of a voltage applied to the respective OPT, or an electric current flowing therethrough.

Figure 2:
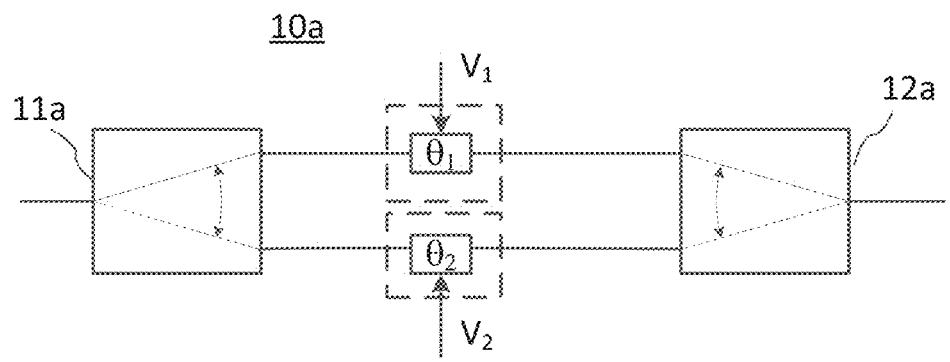
FIG. 2 is a schematic block diagram of an embodiment of the optical circuit of FIG. 1 with input/output optical switches.
Figure 3:
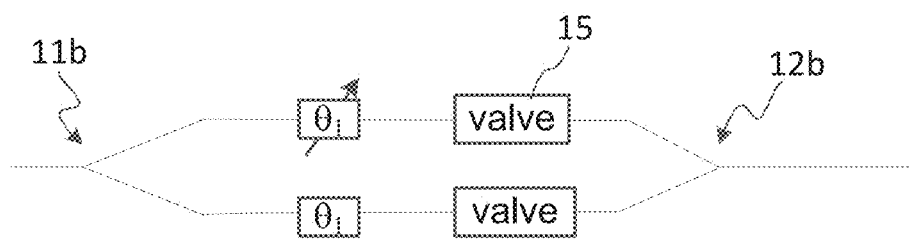
FIG. 3 is a schematic block diagram of an embodiment of the optical circuit of FIG. 1 with a broadcast/block switching architecture.

The switching arrangement 11, 12 is operable to switchably direct light 1 from the input port 1 to the first output port along either one of the first and second optical paths while at least in some embodiments substantially preventing the light 1 from reaching the output port along the other of the first and second optical paths. It will be appreciated that the path switching functionality may be implemented in a variety of ways, two of which are illustrated in FIGS. 2 and 3. FIG. 2 illustrates an embodiment 10a of SPOC 10 wherein the switching arrangement is formed by an input 1×2 optical switch 11a and an output 2×1 optical switch 12a. FIG. 3 illustrates an embodiment 10b of SPOC 10 wherein the switching arrangement is formed by an input optical splitter 11b, an output optical combiner 12b, and two optical valves 15 disposed in the two optical paths 21, 22. The optical valves 15 may be implemented for example with variable optical attenuators (VOA). Either of these embodiments 10a and 10b may be switchable between a first mode of operation wherein light 1 is directed to the output port 4 through the first OPT 41, and a second mode of operation wherein light 1 is directed to the output port 4 through the second OPT 42.

Figure 4:
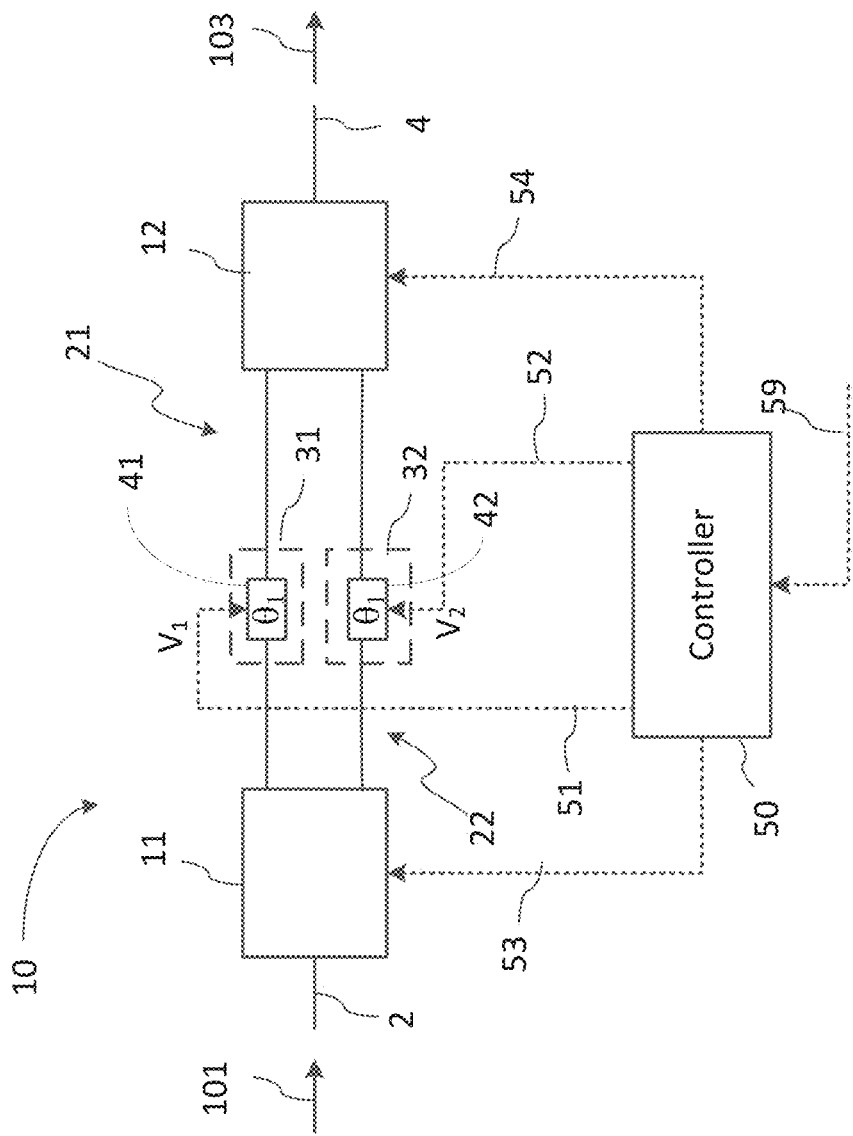
FIG. 4 is a schematic block diagram of the switchable switchable-path optical circuit of FIG. 1 including an operation controller.
Figure 5:
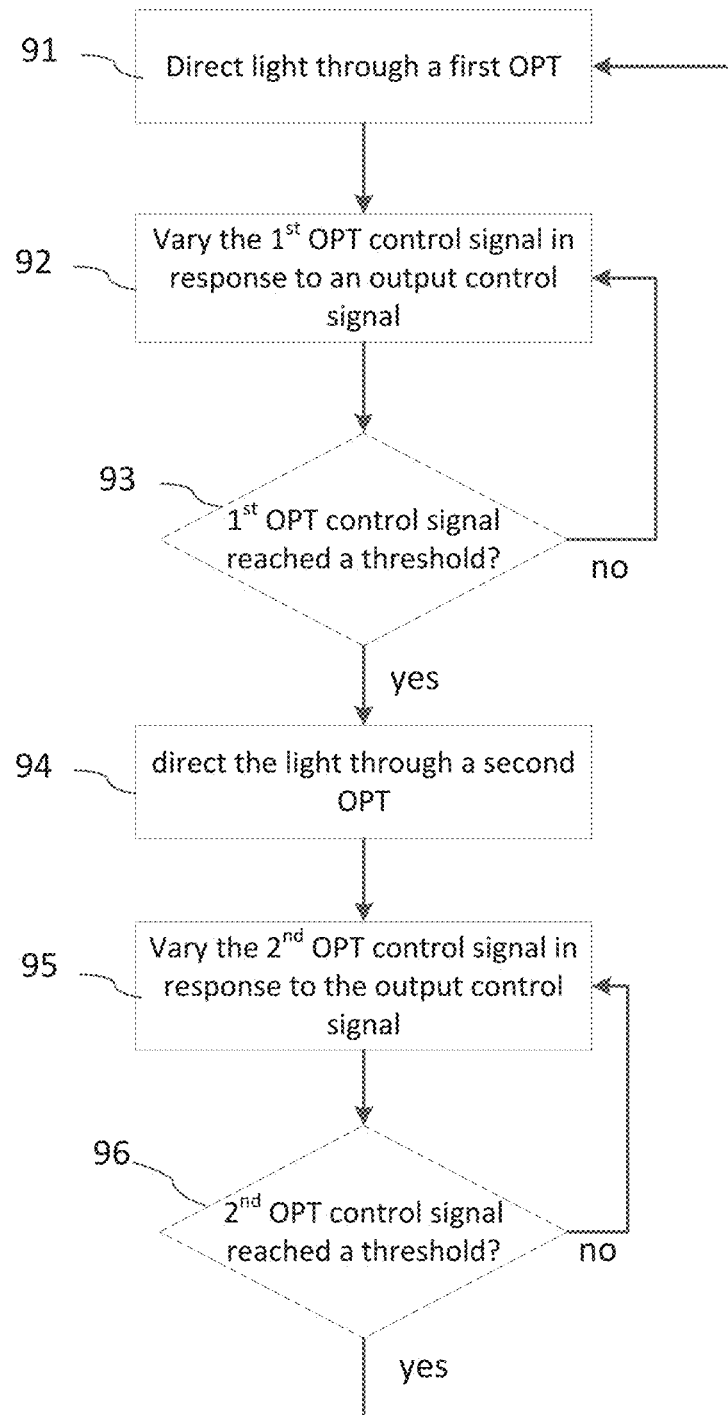
FIG. 5 is a flowchart of a method for controlling an optical phase and/or polarization of light with a switchable-path optical circuit.

With reference to FIGS. 4 and 5, in one embodiment SPOC 10 may be provided with an operation controller 50 (FIG. 4) to implement endless optical phase tuning in accordance with method 90 (FIG. 5). Operation controller 50 may also be referred to herein simply as controller 50. Referring first to FIG. 4, the operation controller 50 may be configured to generate the first and second OPT control signals $V_1$ and $V_2$ that control the optical phase in the respective optical path 21 or 22, and to vary those signals in response to an output control signal 59 that may be generated elsewhere in a system, for example based on a characteristic of an output light 3 from PSOC 10. Operation controller 50 may also be configured to control the path switching in PSOC 10; in the example embodiment of FIG. 4, the path switching is performed by controlling an input optical switch 11 and an output optical switch 12 as schematically illustrated by control lines 53 and 54 in FIG. 4. In another embodiment wherein the input optical element 11 is an optical splitter while the output selector 12 is an optical switch, the path switching may be controlled by switching only the output switch 12 between states in which either the first optical path 21 or the second optical path 22 are connected to the output port 4.

Continuing to refer to FIG. 4, each of the first and second OPT 41, 42 may vary an optical phase of light at its output by varying an optical length of the portion of the respective optical path 21 or 22 in response to varying the respective OPT control signal $V_1$ 51 or $V_2$ 52, for example through an electro-optic, magneto-optic, or thermo-optic effect, or through a thermal expansion of the material in which the optical paths 21, 22 are implemented. Each of the OPT 41, 42 may be characterized by its operating range [$V_{i\ min}$, $V_{i\ max}$], i=1, 2, and require a reset when it is led to operate outside of this range. In order to avoid detrimental effects of these resets on performance of a system in which the OTD is used, the operation controller may switch the light propagation from one of the optical paths 21, 22 in which a threshold for reset free operation has been reached to another, and conduct the OPT reset in the optical path that is currently idle, i.e. not used in the delivery of light 1 to the output port 4.

Referring to FIG. 5, in one embodiment the operation controller 50 may be configured to implement the following method 90 for endless control of optical phase of the output light 3. First, input light 1 is directed to the output port 4 through the first optical controller 31 and/or the first OPT 1, as indicated at block 91. With light 1 propagating through the first optical controller 31, controller 50 may vary the first OPT control signal $V_1$ 51 within the operating range thereof in dependence upon one or more output control signals 55, as indicated at 92. When the one or more output control signals 55 would cause the first OPT control signal $V_1$ to be outside of the operating range thereof, or when $V_1$ reaches a threshold $V_{1thr}$, as may be checked at block 93, controller 50 may operate switches 11, 12 so as to direct light 1 to the output port 4 through the second optical controller 32 and/or the second OPT 42 as indicated at block 94, and vary the second OPT control signal $V_2$ 52 applied to the second OPT 41 in response to the output control signal or signals 55, as indicated at block 95. When the second OPT control signal $V_2$ 52 reaches a threshold $V_{2thr}$, as may be checked at block 96, controller 50 may operate switches 11, 12 to again direct light 1 to output port 4 through the first OPT 1.

The threshold OPT signals $V_{1thr}$ and $V_{2thr}$ may correspond for example to either the lower limit $V_{i\ min}$ or the upper limit $V_{i\ max}$, i=1, 2, of the operating range of the respective OPT, or it may correspond to an OPT signal which cause the respective optical phase to change by $+\!\backslash\!-2\pi$ relative to a reference phase.

In one embodiment operations at block 94 and/or 95 may include adjusting the first OPT control signal 51 $V_1$ away from the respective threshold $V_{1thr}$, for example closer to a middle region of its operating range [$V_{1min}$, $V_{1max}$].

In one embodiment method 90 may include at least a transitional mode of operation during which a first fraction of light 1 is directed through the first OPT 41 while a second fraction of light 1 is directed through the second OPT 42. During this stage the second OPT control signal 52 applied to the second OPT 42 may be adjusted so as to match the optical phase of light at the output port 3 after propagation through the second OPT 42 to the optical phase of light at the output port 3 after propagation through the first OPT 41, so that the output light 3 does not experience an abrupt change in the optical phase when the propagation of input light 1 to the output port 4 is switched from the first optical path 21 to the second optical path 22.

Thus the optical system of FIG. 4 may operate in a first mode wherein light 1 is sent to output port 4 through the first OPT 41 circumventing the second OPT 42, and a second mode wherein light 1 is sent to output port 4 through the second OPT 42 circumventing the first OPT 41. In the following we may be referring to one of the first and second OPT through which light is currently being sent to the output port as the active OPT, and the respective optical path 21 or 22 as the active optical path, and to the other one of the first and second OPT or the first and second optical path as idle. Method 90 may include adjusting the optical phase accrued in the idle optical path to that accrued in the active optical path prior to the path switching.

In embodiments wherein the input optical element 11 is in the form of an optical splitter, a fraction of the input light 1 is passed through both OPTs in both of the operating modes, which may facilitate monitoring light propagating through the idle OPT and adjusting the idle OPT to match the optical phase accrued in the idle optical path to that accrued in the active optical path. The output optical selector 12 in such embodiments may be in the form of an optical switch, or an optical combiner having optical valves disposed at each of its two inputs as illustrated in FIG. 3.

Figure 6:
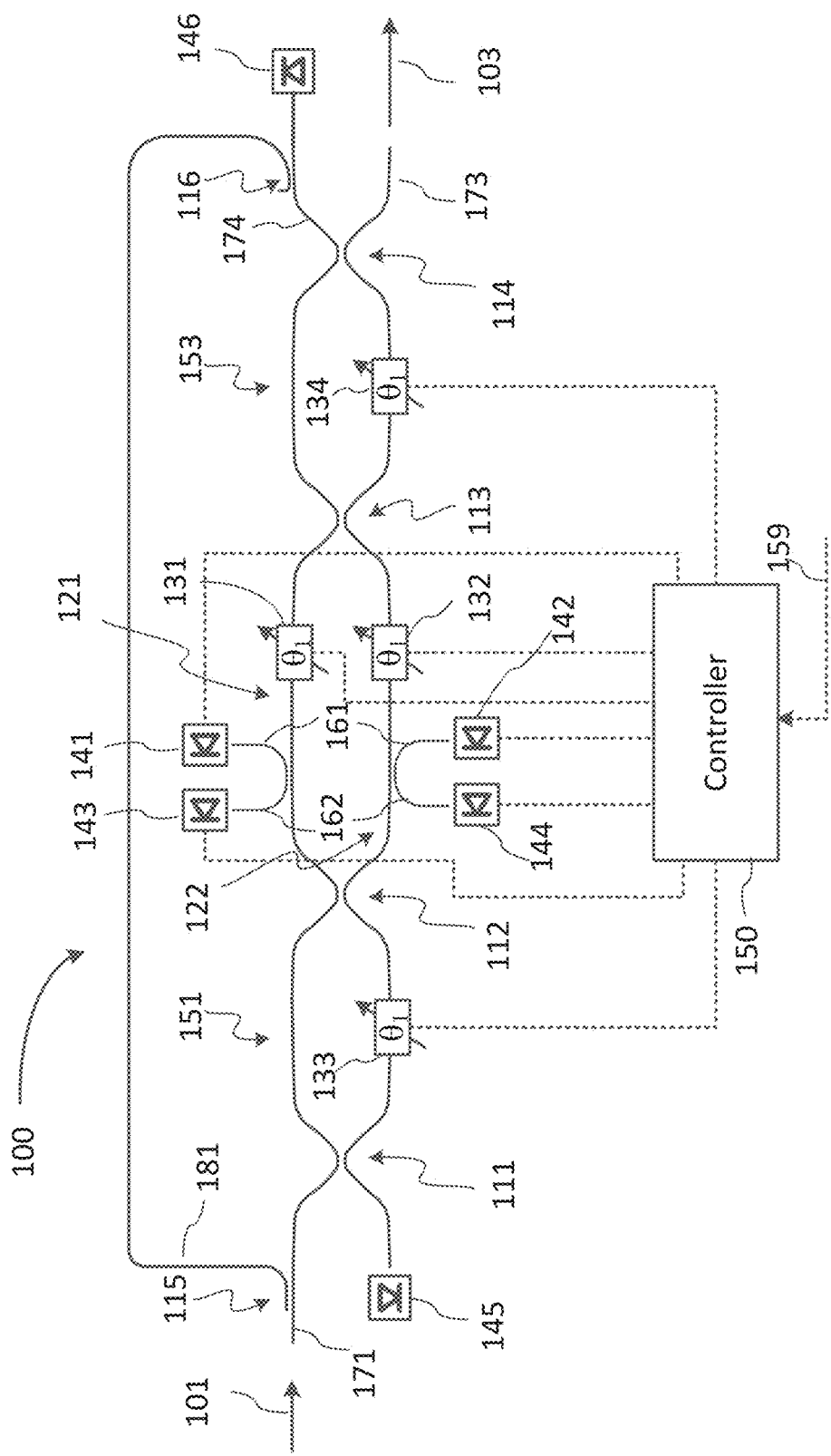
FIG. 6 is a schematic diagram of a coupler-based optical circuit for endless control of the optical phase of light.

Referring now to FIG. 6, there is illustrated a PSOC 100 that may be viewed as an embodiment of PSOC 10 and which is formed of four directional optical couplers 111-114 connected in series one after another to form a coupler chain that connects an input port 171 to an output port 173. The first two optical couplers 111, 112 form a first tunable Mach-Zehnder interferometer (MZI) 151 that may be operated as an input 1×2 optical switch to direct input light 101 along either a first optical path 121 including a first OPT 131 or along a second optical path 122 including a second OPT 132. The first MZI 151 includes a third OPT 133 that actuates the switching action of the MZI 151. The first and second optical paths 121, 122 connect the second optical coupler 112 to the third optical coupler 113 in the chain. The last two optical couplers 113, 114 form a second tunable Mach-Zehnder interferometer (MZI) 153 that may be operated as an output 2×1 optical switch. The second MZI 153 includes a fourth OPT 134 that actuates the switching action of the second MZI 153. The operation of an MZI as a switch is well known in the art and may be actuated by applying a Vπ voltage to an OPT in one of its arms.

In one embodiment one or more optical taps 161 may be provided in one or both of the optical paths 121, 122 for tapping off portions of the input light 103 propagating in the first and second optical paths 121, 122 toward the second optical switch 153, and for coupling said portions into first and second monitoring photodetectors 141, 142 for monitoring the operation of the first optical switch 151.

In one embodiment an auxiliary optical path 181 connecting the input optical port 171 with a second output port of the fourth, or output, coupler 114 may be provided to send a small fraction of input light 101 for propagating through the coupler chain in a backward direction toward the first directional coupler 111. The small fraction of input light 101, for example 1% to 5% in power, may be tapped off using an input optical tap 115 and coupled with a directional coupler 116 into the second output port of the output coupler 144 for backward propagation through the output MZI switch 153 toward the second coupler 112. Third and fourth optical taps 162 that may be disposed in the first and second optical paths 121, 122 respectively in a reverse orientation to tap off backward propagating light for coupling into third and fourth monitoring photodetectors 143, 144, thereby enabling monitoring the operation of the second optical switch 153 in a reverse direction. When the output switch 153 is in a state in which it connects the first optical path 121 to the output circuit port 173, back propagating light from port 174 will be detected at PD 143. When the output switch 153 is in a state in which it connects the second optical path 122 to the output circuit port 173, back propagating light from port 174 will be detected at PD 144.

The PSOC 100 may be actuated by controller 150, which in operation generates OPT control signals for OPTs 131-134 and may vary them in response to changes in an output control signal 159. In one embodiment the system of FIG. 6 may operate generally as described hereinabove with reference to FIGS. 4 and 5, so as to set MZI switches 151, 153 to direct input light 101 to the output port 173 through one of the optical paths 121 and 122, vary the OPT control signal of the corresponding OPT 131 or 132 in that path within its operating range responsive to the output control signal 159, and switching the light propagation to the other of the two optical paths 122 or 121 if the currently active OPT reaches a pre-defined threshold of reset-free operation. The operating range $\Delta\Phi_{OPT}$ of the reset-free operation for OPTs 131 and OPT 132 may vary depending on an embodiment and/or operating conditions, and for at least one of the OPTs 131 and OPT 132 should span at least $2\pi$ radian. In various embodiments the operating range $\Delta\Phi_{OPT}$ may span multiple $2\pi$, for example $6\pi$, $7\pi$, or $8\pi$, and may or may not be equal to an integer number of $2\pi$. Particular value of the phase shift exhibited by the OPT 131 or 132 at switching may vary depending on implementation.

In one embodiment the switching between the optical paths may be performed gradually over a finite switching time τ so that during this switching time a first fraction of the input light 101 may reach the output circuit port 173 through the first OPT 131 while a second fraction of the input light 101 may reach the output circuit port 173 through the second OPT 132. During this transitional state, controller 50 may adjust the first and second OPT signals $V_1$, $V_2$ that control the first and second OPTs 131, 132 so that the optical phase $\phi_{idle}$ of the light fraction that travels through one of the OPTs 131, 132 that was idle before the switching matches the optical phase $\phi_{active}$ of the other light fraction that travels through the other one of the OPTs 131, 132 that was active before the switching was initiated. A feedback indicating whether the required phase matching of the first and second OPTs 131, 132 during the transition may be provided to the controller with the output control signal 159.

Controller 150 may also monitor electrical signals from the monitoring PDs 141-144 so as to control, and adjust as needed, settings of the third and fourth OPTs 133, 134 that actuate the switching actions of the input and output MZI switches 151, 153.

Figure 7:
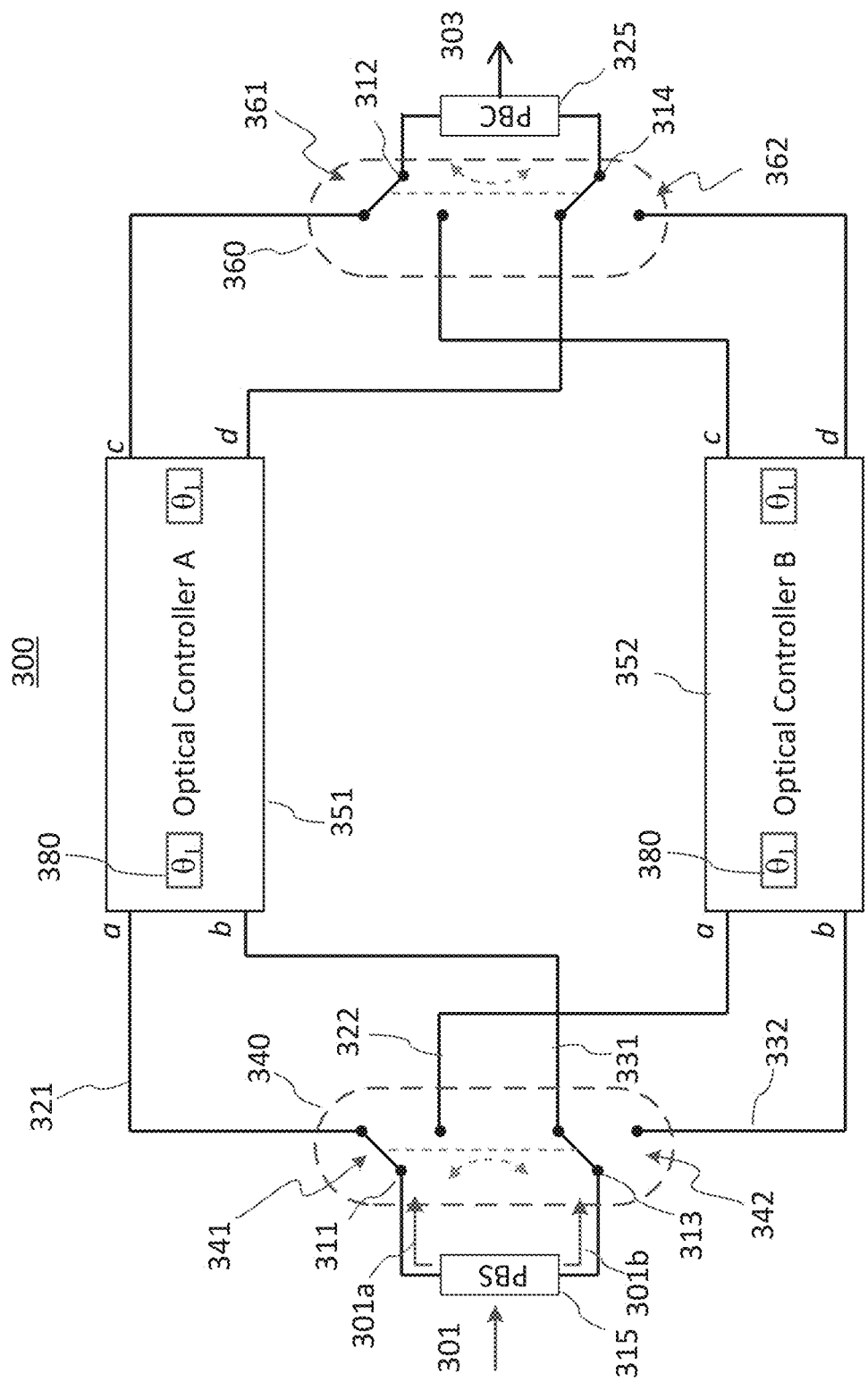
FIG. 7 is a schematic block diagram of a switchable-path optical circuit that is operable as an endless polarization controller.

Turning now to FIG. 7, there is illustrated an example optical circuit 300 in which two path-switchable optical circuits of the type illustrated in FIGS. 1 and 2 are combined, and their respective optical paths coupled, so as to enable endless polarization control of input light 301. An input polarization beam splitter (PBS) 315, which input port may serve as an input port of the circuit, is configured to split input light 301 into first light 301a and second light 301b in dependence on a polarization state of input light 301. The first light 301a and the second light 301b represent two polarization components of the input light 301, which may also be referred to as the first two polarization components of light 301. These two polarization components may then be provided to either one of two optical controllers (OC) 351 and 352, each of which having two input ports a, b and two output ports c, d. Each of the optical controllers 351, 352 is configured to tunably remix the first two polarization components 301a, 301b so as to obtain second two polarization components of the input light 301. The output controller ports c, d of either controller 351 or 352 may be connected to two output circuit ports 312, 314. In some embodiments an output polarization beam combiner (PBC) 325 may be connected to the output circuit ports 312, 314 for recombining the first and second lights 301a, 301b after they propagate through either the first OC 351 or the second OC 352.

In one embodiment the PBS 315 may include a polarization rotator in one of its arms as known in the art, so that the first and second lights 301a, 301b propagate through the first and second optical controllers 351, 352 in the same polarization state. The output PBC 325 may then also include a polarization rotator in one of its arms so as to polarization-multiplex, i.e. combine in orthogonal polarization states, the second two polarization components it receives from either the OC 351 or OC 352.

Each of the first and second OCs 351, 352 may include one or more OPTs 380 and is configured to couple tunable fractions of the first and second light 301a, 301b into each of the output ports 312, 314 with tunable phase shifts therebetween when the respective optical controller 351 or 352 is connected to the first and second output ports 312, 314. In one embodiment each OC 351, 352 includes two or more tunable components such as OPT 380 so as to enable independently tuning both the fractions of the first and second light 301a, 301b and their relative phase at the controller output ports c and d. When suitably configured, each OC 351, 352 may act as a tunable polarization controller that is capable of converting, in cooperation with the polarization-multiplexing PBC 325, input light 301 of an arbitrary SOP to output light 303 of a target SOP. Accordingly each of OCs 351, 352 may be referred to as a polarization controller (PC), and circuit 300 may be referred to as a dual PC, or a switchable-path PC, or, in the absence of the output PBC 325, a switchable-path polarization demultiplexer (SPPDM).

In operation, one of the OCs 351, 352 acts as an active controller and another as the standby controller. When the active controller begins to reach its operating limit, a switch is made to the standby controller after which the previous active controller is reset. Whether the first and second lights 301a, 301b propagate through the first or second OC 351, 352, which then becomes active, depends on a state of a switching arrangement of circuit 300, which in the embodiment of FIG. 7 is comprised of an input switch 340 and an output switch 360. The input switch 340 may be formed of two 1×2 switches 341 and 342, which may be operated in tandem so as to switch between a first state or mode in which both the first light 301a and the second light 301b are directed through the first OC 351, and a second state or mode in which both the first light 301a and the second light 301b are directed through the second OC 352. Similarly the output switch 360 may be formed of two 1×2 switches 361 and 362 operable in tandem to switch between a first state or mode in which the output ports 312, 314 and the PBC 325 are coupled to outputs of either the first OC 351 or the second OC 352 to receive the first and second light therefrom. Input and output switches 340, 360 may be operated synchronously to connect output PBS ports 311, 313 to output circuit ports 312, 314 at the same time to either the first OC 351 or the second OC 352, with the switching performed when the currently active OC reaches a limit of its operating range, that may be predefined.

Figure 8:
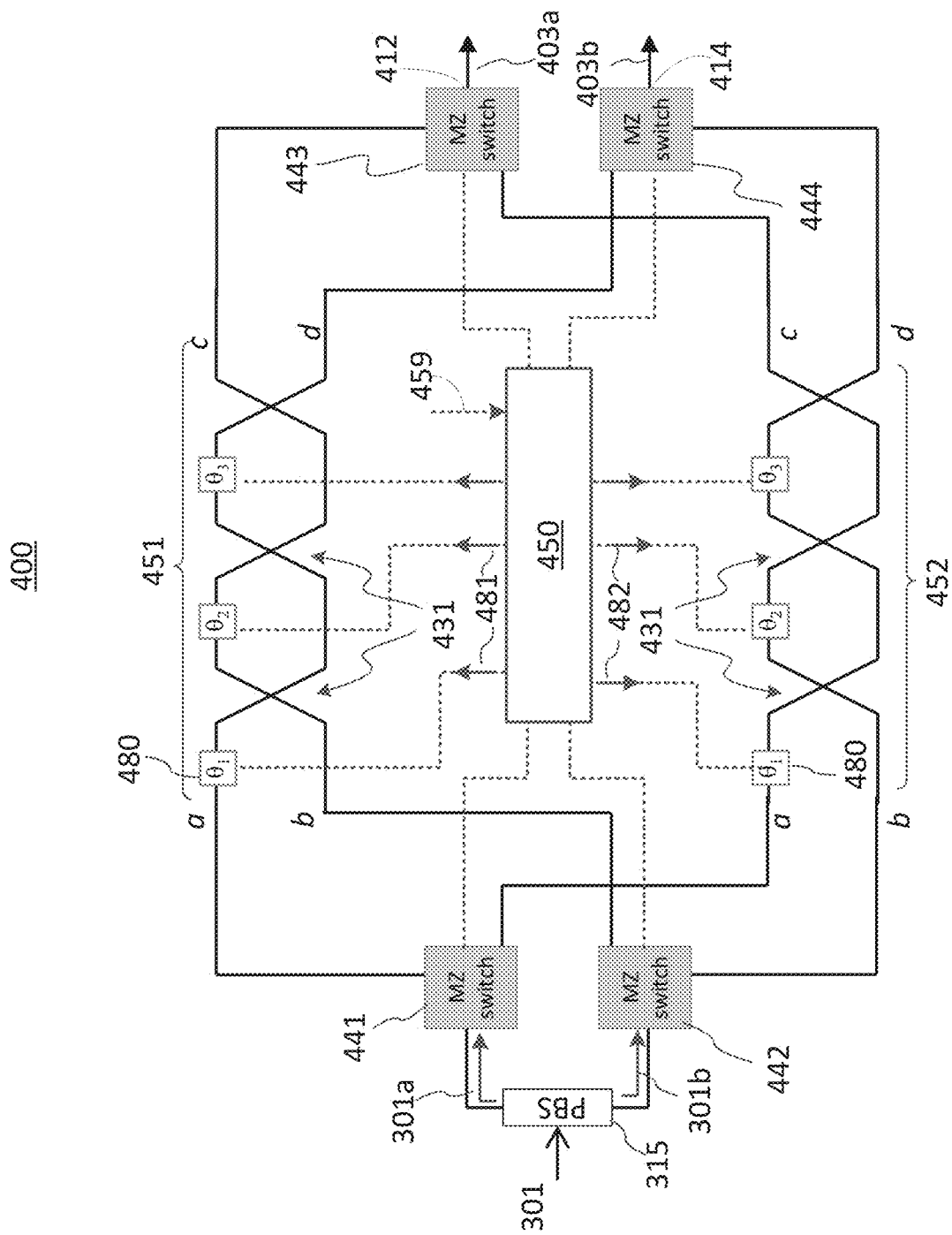
FIG. 8 is a schematic block diagram of an embodiment of the switchable-path optical circuit of FIG. 7 with two output ports for adaptive polarization beam splitting.

Turning now to FIG. 8, there is illustrated an optical circuit 400, which may be viewed as an embodiment of circuit 300 of FIG. 7, which has two output ports 412, 414 and which may operate as an endless adaptive polarization demultiplexer (PDM). The switching arrangement is implemented using two MZI switches 441, 442 at the input and two MZI switches 443, 444 at the output, and the two OCs 351, 352 of FIG. 7 are embodies as three-stage coupler-based PCs 451 and 452, respectfully. The first and second lights 301a, 301b from the PBS 315 are switchably guided to output circuit ports 412, 414 through either the first PC 451 or the second PC 452 using the MZI switches 441-444. Each controller stage of the three-stage PCs 451, 452 includes an OPT 480 connected in series with a coupler 431, and the three couplers 431 in each PC form two serially connected tunable MZIs. Such a three-stage controller employs three tunable phase shifts $\theta_i$, i=1, 2, 3, and is capable of extracting target polarization components from light of any input SOP. Adjusting the respective optical phase shifts $\theta_i$, 1=1, 2, 3 may be viewed as implementing three variable rotation angles about three orthogonal axis of a Poincare sphere, which is conventionally used in the art to describe SOP transformations. In the illustrated embodiment, an OPT 480 is followed by a coupler 431 in each controller stage of the OC 351, 352.

FIG. 8 also schematically shows an operation controller 450 that may be operatively connected to each of the OPTs 480 and switches 441-444, as illustrated in FIG. 8 by dotted lines, and may control their operation using corresponding OPT control signals and switch control signals. As illustrated, the OPTs 480 in the first OC 451 are controlled by first OPT control signals 481, and the OPTs 480 in the second OC 452 are controlled by second OPT control signals 482, each of which can vary within a respective operating range. In one embodiment controller 450 may be configured to first set, for example, switches 441-444 to direct input light 301 through the first OC 451, thereby setting it as currently active with the second OC 352 being in a standby mode, and to vary the first OPT control signals 471 in response to variations in an output control signal 459. When one or more of the first OPT control signals 481 reaches a pre-defined reset threshold, controller 450 may re-direct both components 301a, 301b of the input light 301 to propagate to the output circuit ports 412, 414 through the second OC 452 by flipping switches 441-444, and switch to varying the second OPT control signals 482 in response to variations in the output control signal 459. The output control signal 459 may be generated elsewhere in a system downstream from circuit 400, and may be indicative of a deviation of output lights 403a, 403b of circuit 400 from the desired polarization decomposition of the input light 301. In one embodiment the switching from one of the OCs 451, 452 to the other may be performed over a finite period of time in which fractions of the first and second light 301a, 301b propagate to the output ports 412, 414 through both the first and second OCs 451, 452. In this transitory mode of operation both OCs are active, and controller 450 may tune their OPTs 480 so as to ensure a seamless transition.

In one embodiment the input switches 441, 442 may be replaced with optical splitters, so that in operation both first polarization components 301a, 301b of the input light 301 are always fed into both the first and second OC 451, 452, and the output switches 443, 444 determine whether the output lights 403a, 403b are received from the first OC 451 or the second OC 452. Advantageously, directing a fraction of the input light 301 to an OC that is currently in a standby mode, i.e. not connected to the output ports 412, 414, enables monitoring and adjusting its OPTs prior to switching so as to match the currently active OC in its output thereby enabling a seamless switching between the two OCs when the output switches 443, 444 are flipped.

Advantageously, the optical circuit of FIG. 8 may operate as an endlessly adaptive polarization de-multiplexer that decomposes any input SOP into two target polarization components. One application of such circuit is an optical receiver of polarization-multiplexed (PM) optical signals. In the field of optical communications PM optical signals may be generated at a transmitter (Tx) site by polarization-multiplexing two polarized optical signals. These polarized optical signals, which are conventionally referred to as an X-polarization optical signal and a Y-polarization optical signal, are combined at the Tx in orthogonal polarization states to yield the PM optical signal, which is then transmitted over a communication link to an optical receiver (Rx), where it is to be polarization demultiplexed so the X and Y optical signals can be separately demodulated. The task of extracting the Tx-generated X and Y optical signals, which may be referred to herein as the X-light and Y-light respectively, from the PM light received at the Rx site is however complicated by the polarization mode dispersion in the optical link, typically resulting in a fluctuating SOP of the received optical signal, where the X and Y polarization components are scrambled in a time-dependent manner. In order to assist in the polarization demultiplexing of these signals at the receiver, the transmitter may modulate one or both of the X and Y optical signals, prior to their multiplexing, at distinct modulations frequencies, which are typically much lower than the data rate.

Figure 9:
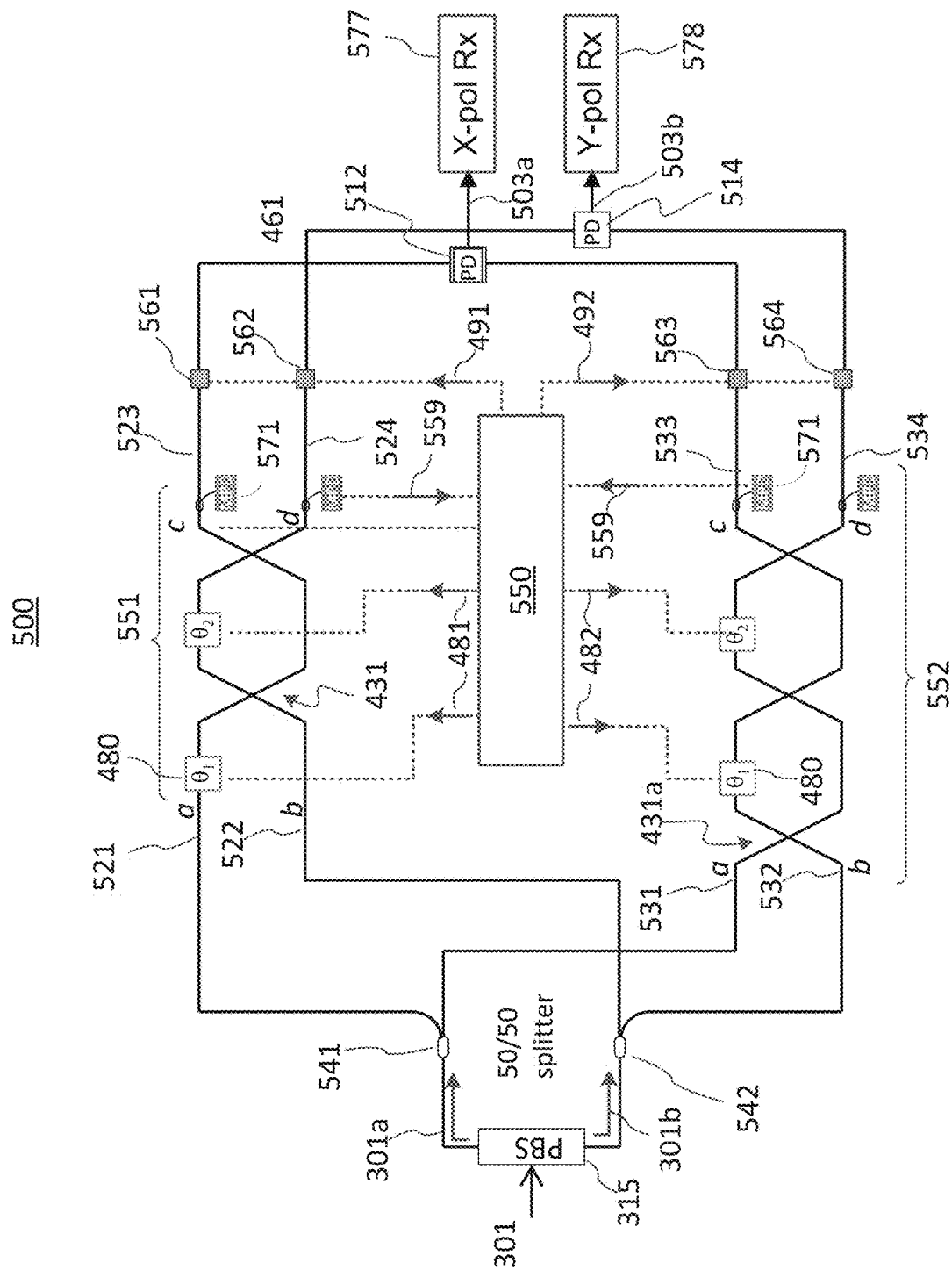
FIG. 9 is a schematic block diagram of a receiver of polarization multiplexed intensity modulated signals using an embodiment of the switchable-path optical circuit of FIG. 8 with input optical splitters.

Turning now to FIG. 9, there is schematically illustrated an optical front-end circuit 500 of an example optical receiver of PM optical signals modulated using an amplitude shift keying (ASK) modulation format. Similarly to circuit 400, circuit 500 includes an input PBS 315 that splits input PM light 301 into first light 301a and second light 301b, and two optical controllers 551, 552 that are switchably connected to two output ports 512 and 514, which in the illustrated embodiment are each in the form, or include, a dual-fed photodetector (PD). Circuit 500 however differs from circuits 300 and 400 in that the two input polarization components 301a and 301b are not switched but instead broadcast simultaneously to both OCs 551, 552, each of which then may be selectively connected to the output ports/PDs 512, 514, in at least some embodiments one at a time, using optical valves 561-564.

Similarly to OCs 351, 352 of circuit 300 and OCs 451, and 452 of circuit 400, each of the two OCs 551, 552 is configured to combine tunable fractions of the first and second light 301a, 301b with a tunable phase shift therebetween in a complementary fashion so as to obtain two output optical signals that may correspond to another two polarization components of input light 301, which may then be separately coupled into the two output ports or PDs 512, 514. The first and second light 301a and 301b correspond to two orthogonal polarization components of the input light 301 as defined by the PBS 315, and each may contain a mixture of the Tx-generated X-light and Y-light that depends on the SOP of input light 301 as received by the PBS 315. The two OCs 551, 552 may be operated so that all of the X-light is outputted from one of the controller output ports of the respective OC, for example port "c" in the illustrated embodiment, and all of the Y-light is outputted from the other output controller port, for example the "d" port in the illustrated embodiment.

In one embodiment optical circuit 500, possibly except an operation controller 550, may be implemented in integrated optics with planar waveguides on a suitable substrate, for example in silicon or silica in a SOT chip. The waveguides may be configured as TE mode waveguides or TM mode waveguides, with the TE mode waveguides assumed hereinbelow by way of example as a typical configuration. The PBS 315 may be implemented as a polarization mode splitter/rotator that first splits the input light into the TE and TM modes, and then rotates the polarization of one of them, for example that of the TM light, so that both the first and second lights 301a, 301b propagate in the circuit 500 as TE light. Generally both the first light 301a and the second light 301b may contain a mixture of the Tx-generated X-light and Y-light. The outputs of the PBS 315 are connected to first and second optical splitters 541, 542, with the first optical splitter 541 connected to first input ports "a" 521, 531 of each of the first and second PC 551, 552, and the second optical splitter 542 connected to second input ports "b" 522, 532 of each of the first and second PC 551, 552. Four optical waveguides pair-wise connect output ports of each PC 551, 552 to the two output PDs 512, 514 so that the first output controller ports "c" 523, 533 of each PC connect to the first output PD 512, while the second output comptroller ports "d" 524, 534 connect to the second output PD 514. The OC or path switching is implemented using optical valves 561-564 that are disposed in the respective optical waveguides, and which may squelch optical connections between the output PDs 512, 514 and the output controller ports of either OC 551 or 552. Each optical valve 561-564 is switchable, responsive to a switch control signal 491 or 492, between an open state wherein it is substantially transparent to light propagating in the respective optical path and a closed state wherein the optical valve prevents the light propagating in the respective optical path from reaching the first or second output circuit port or PD 512, 514. Optical valves 561-564 may be embodied, for example, with variable optical attenuators (VOA), which may be embedded into the respective waveguides as known in the art and may be electrically controlled. Monitoring PDs 571 may be optionally coupled at the output controller ports "c" and/or "d" of one or both of the PCs 551, 552, using optical taps. The monitoring PDs 571 may be used to detect the presence of the distinct dither tone or tomes that may have been added at the Tx to the X and/or Y optical signal.

Controller 550, also referred to herein as the operation controller, may be operatively connected to each of the OPTs 480 and VOAs 561-564, as illustrated in FIG. 9 by dotted lines, to control their operation using corresponding OPT control signals 481, 482 and VOA control signals 491, 492. In one embodiment controller 550 may generate first OPT control signals 481 to control the operation of the OPTs 480 in the first OC 551, second OPT control signals 482 to control the operation of the OPTs 480 in the second OC 552, first VOA control signals 491 to control the operation of VOAs 561, 562 disposed in the optical paths connecting the first OC 551 to the output ports/PDs 512, 514, and second VOA control signals 492 to control the operation of VOAs 563, 564 disposed in the optical paths connecting the second OC 552 to the output ports/PDs 512, 514. Controller 550 may also receive feedback signals 559 from monitoring PDs 571 and may adjust the OPC control signals 481 and/or 482 so as to minimize or maximize a dither tone in the feedback signal 559 from one of the PDs 571, if such distinct dither tone or tones were added at the transmitter to one of the X-light and the Y-light to facilitate their demultiplexing.

In operation, the OPTs 480 of an active controller may be continuously tuned by the operation controller 550 within their respective operating ranges, so as to de-multiplex the Tx-generated X-polarized and Y-polarized optical signals from the TE and TM polarization components of the received light 301, in one embodiment using the feedback from monitoring PDs 571. These two demultiplexed polarization components may then be fed into the first and second output PDs 512, 514 respectively, one which connects to an X-channel electrical receiver 577 and the other to a Y-channel electrical receiver 578.

In one embodiment circuit 500 may operate in a first state in which input light 301 is directed to the output ports or PDs 512, 514 via substantially only the first OC 551 while optical connections between the second OC 552 and the output ports or PDs 512, 514 are substantially blocked by the respective VOAs, or in a second state in which input light 301 is directed to the output ports or PDs 512, 514 via substantially only the second OC 552 while optical connections between the first OC 551 and the output ports or PDs 512, 514 are substantially blocked. In the first state VOAs 563, 564 are operated at a high-attenuation setting and VOAs 561, 562 at a low-attenuation setting, while in the second state their settings are switched so that VOAs 561, 562 are operated at a high-attenuation setting and VOAs 563, 564 at a low-attenuation setting. While circuit 500 is in its first state, the first OC 551 is active while the second OC 552 is in a standby regime, while in the second state the first OC 551 is in a standby regime while the second OC 552 is active. In operation controller 550 may continuously monitor the output control signals 559 and, responsive to variations in said signals, adjust OPT control signals 481 or 482 for one of the first and second OC 551, 552 that is currently active. When one of the OPT control signals of the currently active OC reaches a pre-defined reset threshold, for example a limit of its operating range, controller 550 may switch the operation to the standby OC, making it active. By way of example, controller 550 may first set VOAs 563, 564 to close while keeping VOAs 561, 562 open so that the output PDs 512, 514 receive components of the input light 301 through the first OC 551, thereby setting the first OC 551 as currently active with the second OC 552 being in the standby mode, and to vary first OPT control signals 481 in response to variations in output control signals 559. When one or more of the first OPT control signals 481 reaches a pre-defined reset threshold, such as a limit of its operating range, controller 550 may open VOAs 563, 564 and close VOAs 561, 562 so that the output PDs 512, 514 receive components of the input light 301 through the second OC 552, and to vary the second OPT control signals 482 in response to variations in the output control signals 559. When one of the OPT control signals 482 reaches its operating limit, controller 550 may reconnect the first OC 551 to the output ports while disconnecting the second controller 552.

Each of the OCs 551 and 552 continue to receive the input polarization components 301*a,b* when in the standby mode, and hence may continue to be tuned by controller 550 to demultiplex the X-light and Y-light. In one embodiment the OPTs 480 of OC 551 or 552, when in the standby regime, are controlled so that they, and the corresponding OPT control signals, remain in a middle region of their operation range, for example in a middle 10%-30% thereof; this may require resets, which however do not affect the circuit's output as the standby OC remains disconnected from the output PDs 512, 514. By way of example, the full operating range of an OPT 480 may correspond to a phase shift of 100 rad, while less than 10% of that range may be sufficient for OCs 551, 552 to demultiplex the X-light and Y-light from any input SOP.

In the embodiment illustrated in FIG. 9, each of the two OC 551 and 552 has two tunable controller stages, each formed by an OPTs 480 followed by a coupler 431, and may operate as a two-stage polarization controller. By suitably adjusting the optical phase shifts $\theta_1$ and $\theta_2$ of the OPTs in each stage, such a two-stage OPT and coupler arrangement is capable of converting most input SOPs to any desired output SOP, with possible exceptions as described hereinbelow. There is however a specific input SOP that a two-stage polarization converter cannot convert into any desired output SOP. To illustrate this special case, consider the stages in the form of polarization rotators where the first stage provides a rotation by a variable angle $\theta_1$ around the X axis, or S1 in stokes space, and the second stage provides a rotation by a variable angle $\theta 2$ around the Y axis, or S2 in stokes space. If the input SOP is on the X axis, the first rotation has no effect on the input SOP and so the PC is effectively a single stage rotation around the Y axis, which limits the output SOP to a circle in the XZ plane. This special case problem may be solved in a dual-convert optical circuit of the type illustrated in FIGS. 7-9 by the addition of an extra 2×2 coupler 431*a* at an input of the second controller 552, so that the second OC 552 comprises one more optical coupler than the first OC 553. The operation of the second OC 552 may be understood by noting that the extra 2×2 optical coupler 431*a* provides a 90 degree phase shift to cross-coupled light, which effect may be roughly interpreted as that of a rotation of the input SOP about the Z axis by 90 degrees. This 90 degrees rotation converts the specific-case input SOP on the X axis to that on the Y axis. The $\theta_1$ rotation about the X axis by the first-stage OPT 480 then produces an intermediate SOP anywhere on a circle in the YZ plane. The second and final rotation $\theta_2$ around the Y axis can now place the final output SOP anywhere on the Poincare sphere.

However, OC 552 also has a specific input SOP that can only be converted to a subset of output SOPs. This may be understood by considering an input SOP that is on the Y axis in the model described hereinabove. The extra coupler 431*a* rotates that SOP to the X axis, which cannot be changed by the $\theta 1$ rotation about the X axis at the first controller stage, so that the output SOP of the second controller 552 is again limited to a circle in the XZ plane.

Hence, the first OC 551 has a limitation when the input SOP approaches the X axis and the second OC 552 has the same limitation when the input SOP approaches the Y axis. Hence in one embodiment the operation controller 550 is configured to implement an active/standby control algorithm that takes input SOP into account when selecting which of the first or second OCs 551, 552 is connected to the output ports 512, 514 at any instance of time, and may switch between them to avoid issues associated with the special input SOP cases.

In the embodiment illustrated in FIG. 9, input PM light 301 is assumed to be ASK-modulated, so that the output PDs suffice as the output opto-electrical (OE) converters that preserve the modulation signals. In other embodiments when the input light is PSK or QAM modulated, each of the PDs 512, 514 may be replaced with an optical combiner with inputs connect to the corresponding output controller ports of the two controllers, and which is followed by an optical hybrid (OH), or another suitable optical mixer, with differential PDs at the output thereof. The use of optical combiners at the OH input however results in an additional 3 dB optical loss.

Figure 10:
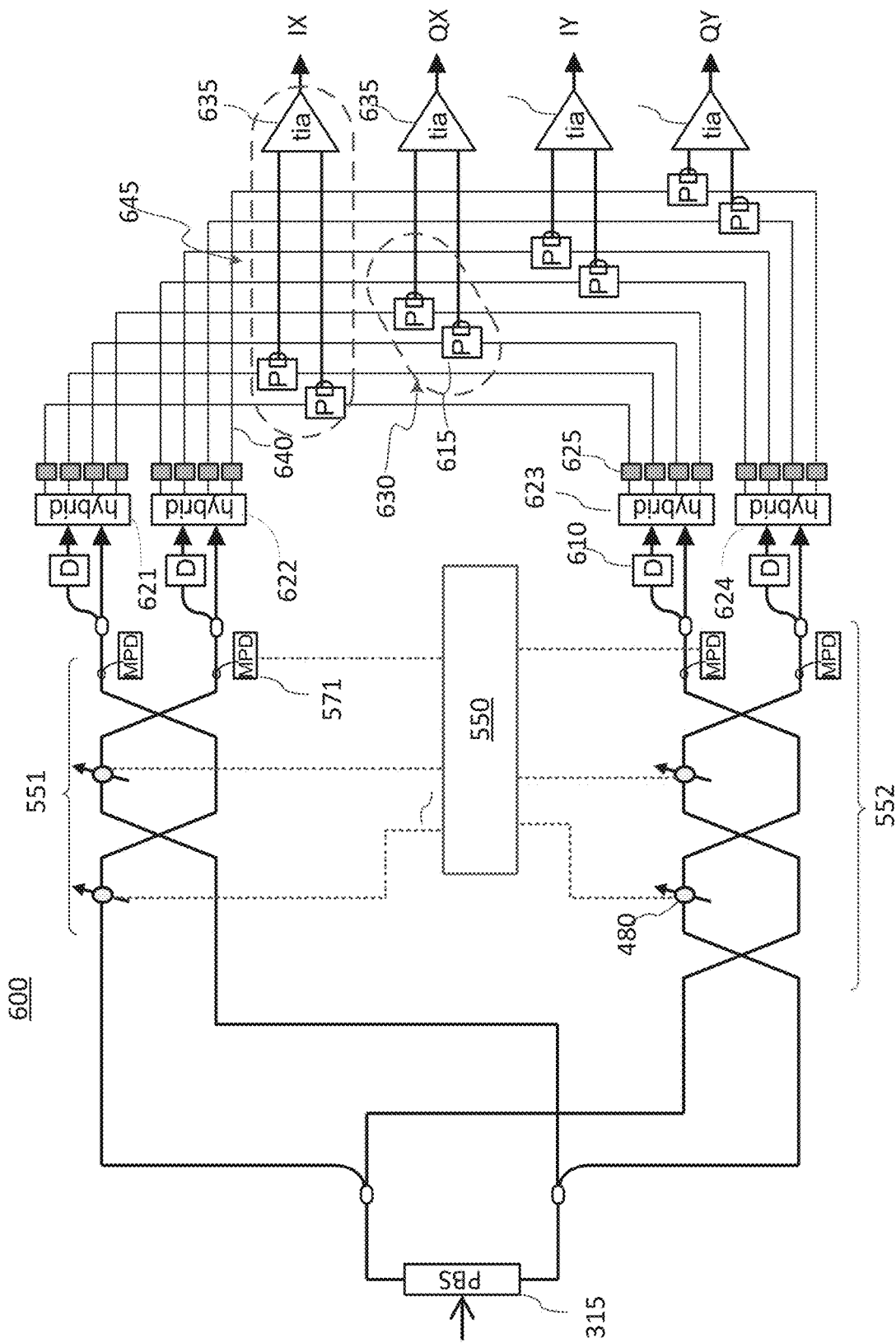
FIG. 10 is a schematic block diagram of a receiver of polarization multiplexed PSK or QAM signals using an embodiment of the switchable-path optical circuit of FIG. 8 with input optical splitters and four optical hybrids.

Turning now to FIG. 10, there is illustrated an optical receiver of quadrature-modulated (QM) PM optical signals that includes an optical circuit 600 at its front end that operates as a dual-path polarization demultiplexer. Circuit 600 is generally similar to circuit 500 of FIG. 9 and includes many of the same elements, such as input PBS 315, OCs 551, 552, MPDs 571, and operation controller 550, which operation has been described hereinabove with reference to FIG. 9. To demodulate optical signals modulated using one of QM formats, such as QPSK and QAM, circuit 600 includes four OHs 621-624, each connected to a different output controller port of the two OCs 551, 552, so that each output controller port of each OC 551, 552 connects to a separate OH. Each OH includes an input signal port for receiving one of the X light or the Y light, and four output ports for transmitting four mixed optical signals from which I and Q modulation signals of a respective polarization channel can be decomposed using differential PDs. The input signal ports of the first two OHs 621, 622 are optically connected to the two output controller ports of the first OC 551, while the input ports of the second two OHs 623, 624 are optically connected to the two output controller ports of the second OC 552. Each of the OHs also includes a second input port for receiving reference light, which in the illustrated embodiment is connected to the same output controller port via a delay line "D" for demodulating differentially modulated signals, but in other embodiments may be connected to a local oscillator (LO).

In operation OCs 551, 552 are switchably controlled by controller 550 to unscramble the X and Y optical signals from input light 301, sending the X light to OHs 621, 623 and the Y light to OHs 622, 624, which outputs connect to eight PDs 615 with 16 waveguides 640. The PDs 615, which may be viewed as output optical ports of circuit 600, which may be dual-fed PDs, each connect to corresponding output controller ports of the two OCs 551, 552 via respective OHs and their corresponding OH output ports. The PDs 615 form four PD pairs 630 which, in combination with TIAs 635, form four differential PDs 645 that output demodulated I and Q signal in each of the X and Y channels. Each of the differential PDs 645 may be switchably connected to either one of the OCs 551, 552 via respective OHs, depending on which of the OCs is currently active and which is on a standby. An array of 16 optical valves 625, which may be embodied with VOAs imbedded in respective waveguides 640, implement the switching arrangement of the circuit, and are operable by controller 550 to establishing one-to-one optical connections between the eight PDs 615 and the output OH ports of either the first two OHs 621, 622 that connect to the output controller ports of OC 551, or the second two OHs 623, 624 that connect to the output controller ports of OC 551. Eight VOAs 625 that are in the optical paths between PDs 615 and an active one of the OCs 551, 552 are kept open while the other eight VOAs 625 are set to high loss to disconnect the standby OC. When one of the OPTs of the currently active OC reaches a limit of its operating range, all of the VOAs are switched to an opposite state, i.e. from the low-loss state to the high-loss state or vice versa, depending on the VOA, whereby the previously standby OC becomes active and connected to the PDs 615, while the previously active OC resets to a middle of its operating range.

Figure 11:
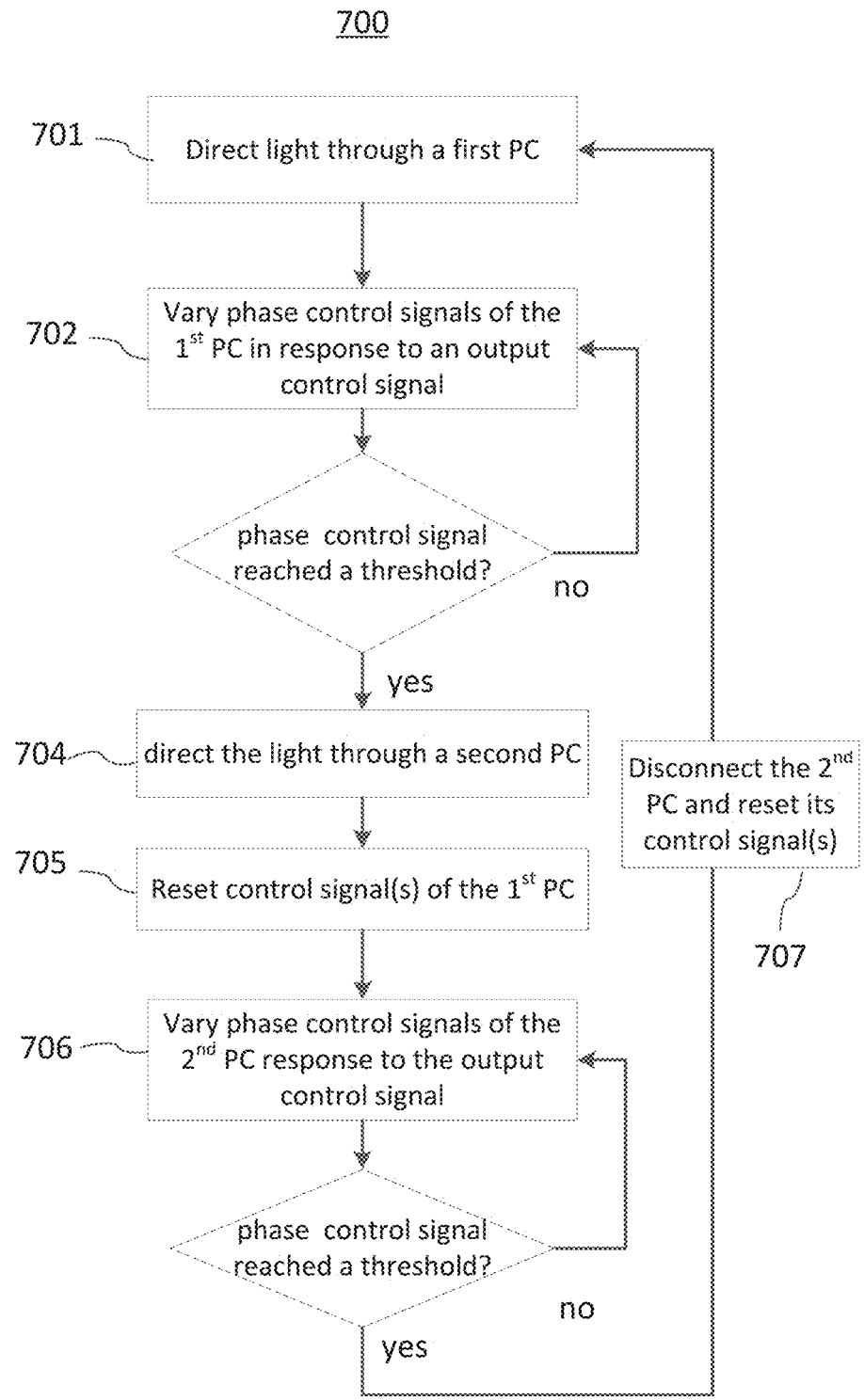
FIG. 11 is a flowchart of a dual-controller method for endless polarization control.

Referring now to FIG. 11, there is illustrated a flowchart of an example method 700 for endless polarization control in an optical circuit that may be implemented in at least some of the optical circuits described hereinabove, or their variants. The method includes the use of two polarization controllers, one of which may be active and the other on standby, and switching between them one the active polarization controller (PC) requires a reset. The standby PC may adjust its setting to match the output of the active PC in a polarization related characteristic prior to the switching to make it seamless, while remaining in a middle region of its operating range. In one embodiment the method starts as step or operation 701 wherein input light is directed to an output port or ports through a first PC. With the input light propagating through the first PC, an operation controller may vary one or more phase control signals of the first PC within the operating range thereof, for example in dependence upon one or more output control signals, as indicated at block 702. When at least one of the phase control signals of the first PC reaches a limit of its operating range or another predefined threshold, the first PC is disconnected from the output and the input light is directed to the output through the second PC as indicated at block 704, and the phase control signal(s) of the first PC are reset to a middle of their operating range as indicated at block 705. With the input signal now being directed to the output through the second PC, the operation controller may vary one or more phase control signals of the second PC within the operating range thereof, for example in dependence upon the output control signal or signals, as indicated at block 706. When at least one of the phase control signals of the second PC reaches a limit of its operating range or another predefined threshold, the second PC is disconnected from the output, and its control signals reset, as indicated at block 707, while the input signal is again directed to the output through the first PC. The optical circuit may continue to cycle through steps 701-707-701 providing endless polarization control. In one embodiment method 700 may include at least temporarily broadcasting input light to each of the two PCs to facilitate matching their outputs at the time of the switching.

One advantage of switchable-path dual-controller configurations, example embodiments of which are described hereinabove, is that they enable seamless and endless polarization control of output light using fewer active controller stages and therefore few control signals to an active controller, which enables a faster update than conventional endless polarization controllers. Furthermore, switchable-path dual polarization controllers as described hereinabove enable to ease requirements on the process of resetting of the phase tuners, which can be performed off-line on an idle controller.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Furthermore, various elements, circuits, features, or functions that are described hereinabove with reference to a particular example embodiment may be added, or otherwise relevant to, other embodiments, and features described with reference to different embodiments may be combined. For example, some embodiments may use a combination of two-stage controllers and three-stage controllers. In another example, output control signals that provide polarization control feedback may be obtained using means other than Tx-generated polarization-specific dither tones, for example such feedback may be based on the bit error rate generated by the electric circuitry of the receiver downstream from the polarization converter or demultiplexer. The optical circuits described hereinabove, and their variants, may be implemented in integrated optics, for example silicon photonics, and also using bulk optics, including with optical fibers. OPTs described hereinabove may be embodied in a plurality of ways, for example using electro-optic, magneto-optic, and/or thermal optical effect. When manufactured on a silicon photonics platform, they may be embodied in silicon-core or dielectric-core waveguides using thermal heaters, or in silicon-core waveguides using p/n junctions. The optical couplers 431 may each be in the form of a 2×2 directional waveguide coupler formed of two evanescently coupled waveguides as known in the art, and may have 1:1 coupling ratio.

Furthermore, it will be appreciated that different dielectric materials and semiconductor materials other than silicon, including but not limited to compound semiconductor materials, such as GaAs, InP, and their alloys and compounds, may be used to fabricate the optical circuits example embodiments of which are described hereinabove. In another example, although example embodiments described hereinabove may have been described primarily with reference to waveguide-based polarization controllers composed of OPTs and directional waveguide couplers, in other embodiments bulk polarization controllers made with electro-optic birefringent materials such as lithium niobate may be used in a dual-controller configuration following principles described hereinabove.

It will be appreciated that other changes and modifications may become evident to those skilled in the art having the benefit of the present disclosure without departing from the spirit and scope of the invention as defined by the claims.

What is claimed is:

1. An optical circuit for adaptive polarization splitting of input light, comprising:
    a polarization beam splitter (PBS) configured to split input light into first two polarization components thereof;
    two output circuit ports;
    two optical controllers, each configured to tunably convert the first two polarization components of the input light into second two polarization components of the input light, wherein each of the two optical controllers includes two input controller ports, two output controller ports, and at least one optical phase tuner (OPT) that is configured to vary an optical phase of light propagating therethrough within an operating range thereof; and,
    a switching arrangement operable to switchably direct the input light to the two output circuit ports through either one of the two optical controllers.

2. The optical circuit of claim 1 wherein each of the two optical controllers comprises at least two controller stages connected in sequence, each controller stage comprising an OPT and a 2×2 waveguide coupler.

3. The optical circuit of claim 1 wherein each optical controller comprises an input 2×2 waveguide coupler having two input coupler ports for receiving the two first polarization components of the input light and an output 2×2 waveguide coupler having two output coupler ports for connecting to the two output circuit ports.

4. The optical circuit of claim 2 wherein one of the two optical controllers comprises one more 2×2 waveguide coupler than the other of the two optical controllers.

5. The optical circuit of claim 1 wherein the switching arrangement comprises two input 1×2 optical switches configured to switchably connect output ports of the PBS to the two input controller ports of either one of the two optical controllers, and two output 2×1 optical switches configured to switchably connect the two output circuit ports to the two output controller ports of either one of the first or second optical controllers.

6. The optical circuit of claim 2 including two optical splitters connecting each output of the PBS to one of the input controller ports of each of the two optical controllers.

7. The optical circuit of claim 6 wherein the switching arrangement comprises two output 2×1 optical switches configured to switchably connect the two output circuit ports to the two output controller ports of either one of the first or second optical controllers.

8. The optical circuit of claim 6 wherein the switching arrangement comprises four optical valves disposed in optical paths connecting the two output circuit ports to each of the two optical controllers, and wherein each optical valve is switchable between an open state wherein it is substantially transparent to light propagating in the corresponding optical path and a closed state wherein the optical valve breaks the corresponding optical path.

9. The optical circuit of claim 8 further including at least two monitoring photodiodes (PD) coupled to output controller ports of the two optical controllers, further including:
    an operation controller operatively connected to the four optical valves, the monitoring PDs, and the OPTs in each of the two optical controllers, wherein the operation controller is configured to:
    operate the four optical valves so as to connect only one of the two optical controllers to the two output circuit ports at a time; and
    tune the at least one of the OPTs of one of the two optical controllers that is being currently connected to the first and second output circuit ports of the optical circuit in dependence upon one or more feedback signals received from the monitoring PDs.

10. The optical circuit of claim 1 including a polarization beam combiner optically connected to the two output circuit ports and configured to polarization multiplex light received therefrom.

11. The optical circuit of claim 1 for de-multiplexing polarization multiplexed (PM) optical signals, further comprising:
    two or more electro-optical (EO) converters separately coupled to the two output circuit ports, wherein each of the two EO converters comprises at least one of an optical hybrid and a photodetector.

12. The optical circuit of claim 1 for de-multiplexing polarization multiplexed (PM) quadrature-modulated (QM) optical signals, further comprising:
    four optical hybrids (OH), each OH including four output OH ports and an input HP port, the four OHs including first two OHs with the input ports optically connected to the two output controller ports of one of the two optical controllers, and second two OHs with the input ports optically connected to the two output controller ports of the other one of the two optical controllers; and,
    eight photodetectors (PD);

wherein the switching arrangement is operable to switch between the eight PDs and the output OH ports of either the first two OHs or the second two OHs.

13. The optical circuit of claim 12 wherein the switching arrangement comprises:
    eight first waveguides for individually connecting the eight PDs to the OH output port of the first two OHs;
    eight second waveguides for individually connecting each OH output port of the second two OHs to the eight PDs; and,
    a plurality of optical valves operable to synchronously break the one-to-one optical connections between the eight PDs and either the first two OHs or the second two OHs, while opening the one-to-one optical connections between the eight PDs and the other of the first two OHs or the second two OHs.

* * * * *